United States Patent
Nilsson (10) Patent No.: US 12,316,755 B2
(45) Date of Patent: *May 27, 2025

(54) KEY GENERATION SYSTEMS AND METHODS

(71) Applicant: Intertrust Technologies Corporation, Milpitas, CA (US)

(72) Inventor: Jarl Nilsson, Mountain View, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,126

(22) Filed: Nov. 9, 2023

(65) Prior Publication Data

US 2024/0080188 A1 Mar. 7, 2024

Related U.S. Application Data (63) Continuation of application No. 17/199,399, filed on Mar. 11, 2021, now Pat. No. 11,849,033.

(60) Provisional application No. 63/082,855, filed on Sep. 24, 2020.

(51) Int. Cl.
*H04L 9/08* (2006.01)
*H04L 9/06* (2006.01)

(52) U.S. Cl.
CPC .......... *H04L 9/0861* (2013.01); *H04L 9/0643* (2013.01); *H04L 9/0894* (2013.01)

(58) Field of Classification Search
CPC .... H04L 9/0861; H04L 9/0643; H04L 9/0894

USPC .......................................................... 713/168
See application file for complete search history.

(56) References Cited

U.S. PATENT DOCUMENTS

| | | | | |
|---|---|---|---|---|
| 10,193,690 B1 * | 1/2019 | Self | .................... | H04L 9/0894 |
| 2021/0312546 A1 * | 10/2021 | Yim | ..................... | G06Q 20/02 |
| 2021/0391990 A1 * | 12/2021 | McElveen | ............. | H04L 9/0643 |
| 2022/0231848 A1 * | 7/2022 | Zhang | .................. | H04L 9/0822 |

OTHER PUBLICATIONS

Non-Final Office Action dated Apr. 6, 2023 in U.S. Appl. No. 17/199,399.
Notice of Allowance dated Aug. 9, 2023 in U.S. Appl. No. 17/199,399.

* cited by examiner

*Primary Examiner* — Linglan Edwards
*Assistant Examiner* — Phuc Pham
(74) *Attorney, Agent, or Firm* — John P. Davis; Thayne and Davis LLC (57) ABSTRACT

This disclosure relates to, among other things, key generation systems and methods. Certain embodiments disclosed herein provide for generation of cryptographic keys based on one or more defined key generation rules. Key generation consistent with various aspects of the disclosed embodiments may increase the difficultly and/or cost of producing public keys and, by extension, discourage the generation of fake keys used in connection with a key flooding attack. In certain embodiments, generated keys and/or associated key generation rules may depend, at least in part, on associated binding data.

20 Claims, 6 Drawing Sheets

| Rule ID | Rule Complexity | Key Generation Rule Parameters |
|---------|-----------------|-------------------------------|
| 1 | Low | First 5 bytes of the generated key begin with byte integer values 1, 2, 3, 4, and 5 |
| 2 | Medium | First 10 bytes of a hash of the generated key begin with byte integer values 1, 2, 3, 4, 5, 6, 7, 8, 9, and 10 |
| 3 | High | First 4 bytes of a hash of the generated key match the first 4 bytes of a hash of the binding data |

KEY GENERATION SYSTEMS AND METHODS

RELATED APPLICATIONS

This application is a continuation of U.S. application Ser. No. 17/199,399, filed Mar. 11, 2021, and entitled "KEY GENERATION SYSTEMS AND METHODS," which claims benefit of priority under 35 U.S.C. § 119(e) to U.S. Provisional Patent Application No. 63/082,855, filed Sep. 24, 2020, and entitled "KEY GENERATION SYSTEMS AND METHODS," both of which are incorporated herein by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for generating keys. More specifically, but not exclusively, the present disclosure relates to systems and methods for generating public keys that mitigate the potential for key flooding attacks.

Public key implementations such as, for example and without limitation, Gnu Privacy Guard ("GPG") key implementations, may facilitate the secure transmission of information between parties and/or the verification of message authenticity and/or origin. Key flooding is one potential attack on a public key implementation. Key flooding attacks may occur when a hostile entity produces many records that bind a public key with some data. For example, a flooding attack on the GPG infrastructure may involve a hostile party producing a large number of public keys bound to the same e-mail address. The true e-mail address and public key record may, over time, become buried in a mass of fake keys, and eventually the true public key may be rendered practically unusable.

Key flooding attacks may be feasible when the ease and cost of producing a large number of public keys is relatively low. Consistent with embodiments disclosed herein, systems and methods are described that generate public keys based on one or more defined key generation rules. Key generation consistent with various aspects of the disclosed embodiments may increase the difficulty and/or cost of producing public keys and, by extension, discourage the generation of fake keys used in connection with a key flooding attack. In certain embodiments, generated keys and/or associated key generation rules may depend, at least in part, on the associated data bound to the keys.

Consistent with embodiments disclosed herein, in some embodiments, a key generation process, which may be performed by a key service and/or other trusted service, may include receiving a request to generate a cryptographic key (e.g., a public key). In some embodiments, the request may be received from a device, system, and/or service separate from the key service. In further embodiments, the key service may comprise a system and/or device-level service and the request may be received from a service and/or application executing on the system and/or device.

The service may generate one or more candidate cryptographic key using any suitable key generation process. For example, in some embodiments, the key service may randomly generate one or more candidate cryptographic keys.

The candidate keys may be compared with one or more key generation rules to determine whether at least one key of the candidate keys complies with one or more requirements specified in the rules. In some embodiments, the one or more key generation rules may be specified in the key generation request. A variety of key generation rules may be used in connection with the disclosed embodiments. For example, a key generation rule may specify that generated keys and/or a derivative of generated keys should include a specified pattern (e.g., bit and/or byte integer patterns), potentially in a specified location.

In further embodiments, binding data may be received by the key service. In some embodiments, the binding data may be received as part of the key generation request. The binding data may comprise identification information such as an e-mail address, although other suitable types of binding data are also contemplated. In some embodiments, a key generation rule may specify that generated keys and/or derivatives of generated keys should have a predefined relationship with associated binding data and/or a derivate of the binding data (e.g., sharing specific bit and/or byte patterns with the binding data and/or derivative of the binding data, potentially in one or more specified locations).

When a candidate key is identified that satisfies one or more requirements of an applicable key generation rule, the key may be provided to the requesting service, system, and/or application in response to the key generation request. In various embodiments, the key and the associated binding data may be stored by the key service for use in connection with future key validation processes.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Consistent with embodiments of the disclosed systems and methods, public keys may be generated in a manner that discourages the generation of fake keys that could be used in connection with a key flooding attack. Key generation rules may be defined that may increase the computational difficulty of generating valid public keys. Due to the this increased computational difficulty and attendant key generation costs, a hostile entity may be discouraged from generating numerous fake keys for use in connection with a flooding attack.

Figure 1:
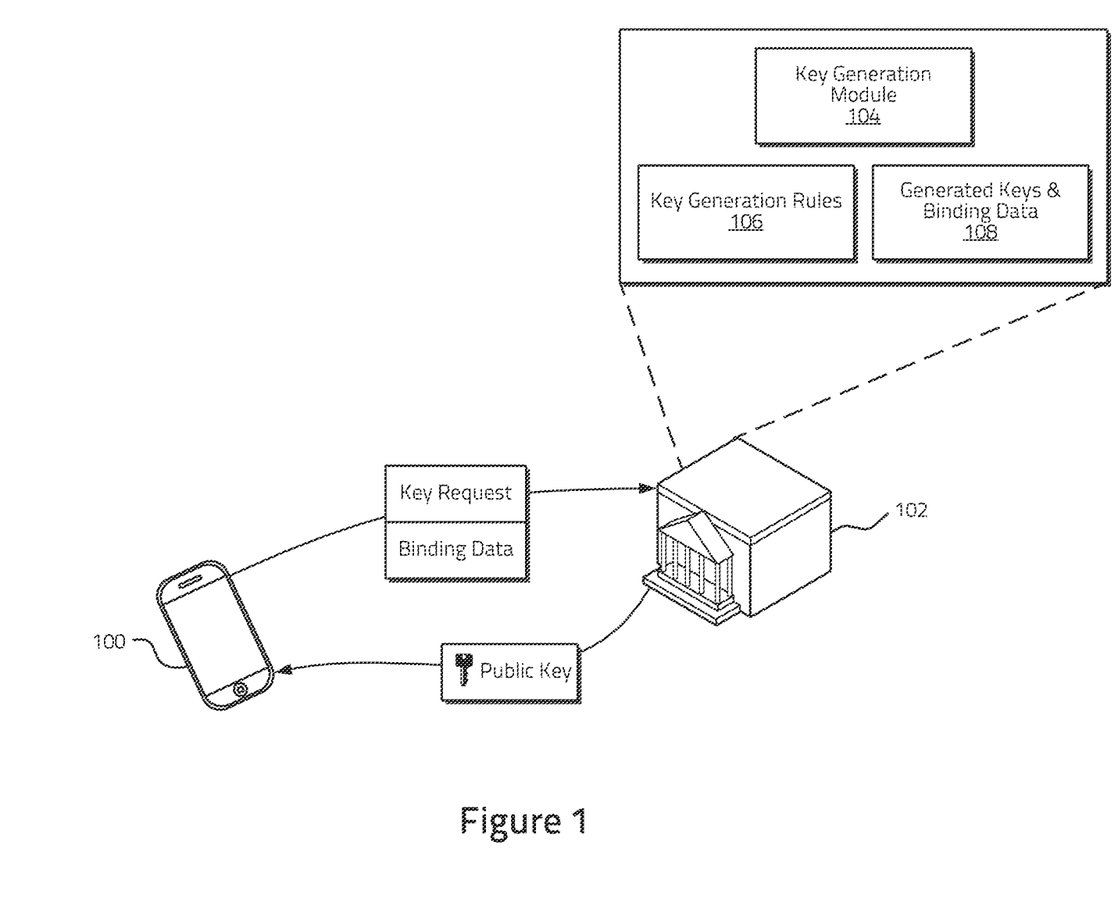
FIG. 1 illustrates an example of a key generation architecture consistent with certain embodiments of the present disclosure.

FIG. 1 illustrates an example of a key generation architecture consistent with certain embodiments of the present disclosure. As illustrated, a device 100 may interact with a key service 102 in connection with one or more cryptographic operations such as, for example, key generation operations. Although the key service 102 is illustrated as a separate service from the device 100, it will be appreciated that in further embodiments, the key service 102 may be integrated as an executable service implemented by the device 100. For example, in some embodiments, the key service 102 may operate as a secure device-level service of device 100 that may be called to perform cryptographic operations including key generation operations. In various embodiments, cryptographic and/or other secure communication techniques may be used to enable secure communication of information between the device 100 and the key service 102.

The device 100 and/or key service 102 and/or one or more other associated systems and/or services may comprise a variety of computing devices and/or systems, including any computing system or systems suitable to implement embodiments of the various systems and methods disclosed herein. For example without limitation, the device 100, key service 102, and/or one or more other associated systems and/or services may comprise one or more laptop computer systems, desktop computer systems, server computer systems, distributed computer systems, set top boxes, media devices, mobile devices, smartphones, tablet computers, and/or any other type of computing system and/or device.

In certain embodiments, the device 100, key service 102, and/or one or more other associated systems and/or services may comprise at least one processor system configured to execute instructions stored on an associated non-transitory computer-readable storage medium. As discussed in more detail below, the device 100, key service 102, and/or other associated systems and/or services may further comprise a trusted execution environment ("TEE") and/or a secure processing unit ("SPU") that may be configured to perform sensitive operations such as trusted credential and/or key management, secure policy and/or rule enforcement and/or management, and/or other aspects of the systems and methods disclosed herein. For example, in certain embodiments where the key service 102 is integrated into the device 100 as a device-level service, the key service 102 may be executed in a secure and/or protected manner within a TEE, SPU, and/or other secure environment of the device 100. In various embodiments, a TEE and/or a SPU may comprise and/or otherwise interface with secure hardware resources that may deliver cryptographic, key protection, and/or other secure information management services.

The device 100, key service 102, and/or other associated systems and/or services may further comprise software and/or hardware configured to enable electronic communication of information between the device, service, and/or other services and/or systems via a network using any suitable communication technology, standard, and/or combinations thereof. The device 100, key service 102, and/or other associated systems and/or services may be communicatively coupled using a variety of networks and/or network connections. In certain embodiments, the network connections may comprise a variety of network communication devices and/or channels and may utilize any suitable communications protocols and/or standards facilitating communication between the device 100, key service 102, and/or other systems and/or services.

The network connections may comprise Internet, a local area network, a virtual private network, and/or any other communication network connections utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network connections and/or a digital mobile communications network connections utilizing, for example and without limitation, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and/or any other suitable standard or standards.

As illustrated, the device 100 may issue a key request to the key service 102. For example, in some embodiments, the device 100 may issue a request to the key service 102 to generate and return to the device 100 a public key. In certain embodiments, the request may specify one or more key generation rules that may be used in connection with generating the requested public key. In further embodiments, and as discussed in more detail below, the key generation request may specify a level of complexity of key generation rules that may be used by the key service 102 to generate the requested public key and/or a level of complexity of a resulting generated key.

In some embodiments, the device 100 may further communicate binding data and/or data derived from binding data (e.g., a hash of binding data) to the key service 102. The binding data may comprise any data that the device 100 may wish to associate with a key generated by the key service 102 in response to the key request. In some embodiments, the binding data may comprise identification information, which in some instances may be unique identification information, associated with the device 100 and/or an associated user. In at least one non-limiting example, the binding data may comprise an email address associated with the device 100 and/or an associated user. It will be appreciated that a variety of types of binding data and/or derivatives of binding data may be used in connection with the disclosed embodiments, and that any suitable type and/or types of binding data and/or associated derivatives may be used in connection with the disclosed systems and methods.

In response to the key request, the key service 100 and/or a key generation module 104 executing thereon may generate one or more keys. Consistent with various embodiments disclosed herein, the key service 100 may generate one or more keys in accordance with one or more key generation rules. In certain embodiments, the key request may comprise information relating to the one or more key generation rules that are to be used by the key generation module 104 in connection with generating the requested key. For example and without limitation, the key request may comprise identification information specifying a key generation rule and/or specified key generation rule parameters. In further embodiments, the key request may specify an indication and/or level of complexity associated with generating a requested key (e.g., "high", "medium", "low", a suitable numerical indication of complexity, and/or the like). The indication and/or level of complexity may be used by the key generation module 104 to select a key generation rule from one or more key generation rules included in a key generation rule database 106 maintained by the key service 102 to use in connection with generating a key in response to the key request.

A variety of key generation rules may be used in connection with embodiments of the disclosed key generation systems and methods. In some embodiments, key generation rules may specify that generated keys and/or derivatives thereof (e.g., hashes of the keys) should include certain defined bit and/or byte patterns. For example and without limitation, a rule may specify that a generated key begin, end, and/or otherwise contain a certain pattern of byte integer values and/or that a hash of a generated key begin, end, and/or otherwise contain a certain pattern of byte integer values. In further embodiments, key generation rules may specify that generated keys should have a predefined relationship with associated binding data. For example and without limitation, a rule may specify that a certain number of bytes of a hash of a generated key should match a certain number of bytes of binding data associated with the key.

Keys generated by the key generation module 104 may be stored by the key service 102, potentially with associated binding data, in a key and/or associated binding data database 108. In some embodiments, keys and/or binding data included in the database 108 may be queried in connection with other key generation processes (e.g., private key generation processes) and/or key validation functions performed by the key service 102. For example, in some embodiments, the key service 102 may be queried by one or more devices, systems, and/or services to determine whether a specified key is associated with specified binding data within the database 108.

The key service 102 may return the generated key to the requesting device 100. For example, as illustrated, the key service 102 may return a generated public key to the device 100, which may be associated with the binding data provided to the key service 102 by the device 100 in connection with the key generation request.

Figure 2:
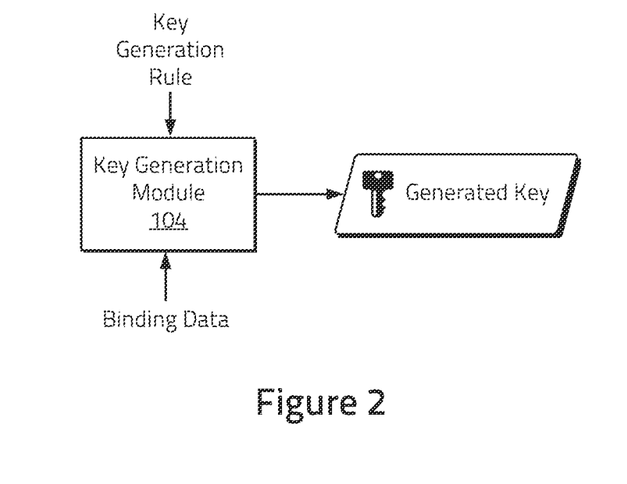
FIG. 2 illustrates an example of a key generation process consistent with certain embodiments of the present disclosure.

As discussed above, key generation rules may be defined that may be enforced in a key generation process performed by a key service to increase the computational difficulty of generating keys, which in some embodiments may include public keys. FIG. 2 illustrates an example of a key generation process consistent with certain embodiments of the present disclosure. A variety of key generation rules may be used in connection with key generation processes consistent with certain embodiments disclosed herein. For example and without limitation, a key generation rule may articulate that keys generated by a key generation module 104 and/or derivatives of the same (e.g., hashes of the keys) should include certain bit patterns and/or byte integer patterns, should have a predefined relationship with associated binding data (e.g., matching bit and/or byte integer patterns), and/or the like.

In at least one non-limiting example, a key generation rule used by the key generation module 102 in connection with key generation processes may articulate that public keys generated by the module 104 and/or hash values of the generated public keys should begin with the byte integer values 1, 2, 3, and 4 and/or include such a pattern elsewhere in the keys and/or associated hashes of the keys. The key generation module 102 may generate a number of candidate keys until one is generated that includes the byte integer pattern specified in the key generation rule and/or includes the byte integer pattern in a specific location specified in the rule. Once such a key has been generated, the key generation module 104 may provision it to a device and/or system as a valid public key.

A device and/or process relying on the generated public key may examine the key and determine that it is valid based on the key conforming to the requirements of the key generation rule. For instance, in the above example, if the public key begins with the byte integer values 1, 2, 3, and 4, it may be considered to be a valid public key. If not, it may be treated as a fake key. In various embodiments, a party relying on the public key can determine the amount of complexity required by examining the key, the key generation rule, and/or the associated binding data (as discussed in more detail below), to determine the complexity of the processes required to create the key, providing a certain measure as to value and/or uniqueness of the key.

In certain embodiments, a key generation rule may articulate that binding data associated with a key should have a predefined relationship with valid generated keys. For example and without limitation, a key generation rule may articulate that a bit pattern associated with a valid key and/or or a derivative of the key (e.g., a hash of the key) should match a bit pattern of the associated binding data and/or a derivative of the binding data (e.g., a hash of the binding data).

In at least one non-limiting example, a party may wish to generate a GPG key associated with a particular e-mail address—sales@acme.com. A key generation rule may be employed that stipulates that the SHA256 hash of the e-mail address string and the SHA256 hash of a Privacy-Enhanced Mail ("PEM") format of a valid generated public key should start with the same four bytes and/or otherwise be related in some predefined way. One or more candidate keys may be generated by the key generation module 104 until a key is generated that conforms with the one or more requirements specified in the key generation rule. In various embodiments, the complexity of the key generation may be increased by increasing the length of the byte pattern shared between the valid public key and/or a derivative thereof and the binding data and/or a derivative thereof that should match and/or otherwise have a predefined relationship.

If a hostile party wanted to flood a database of bindings between an e-mail address and/or other binding data and a public key, use of key generation processes consistent with the disclosed embodiments may increase the amount of time and/or effort required to mount such an attack and, in many instances, may render such an attack impractical.

Figure 3:
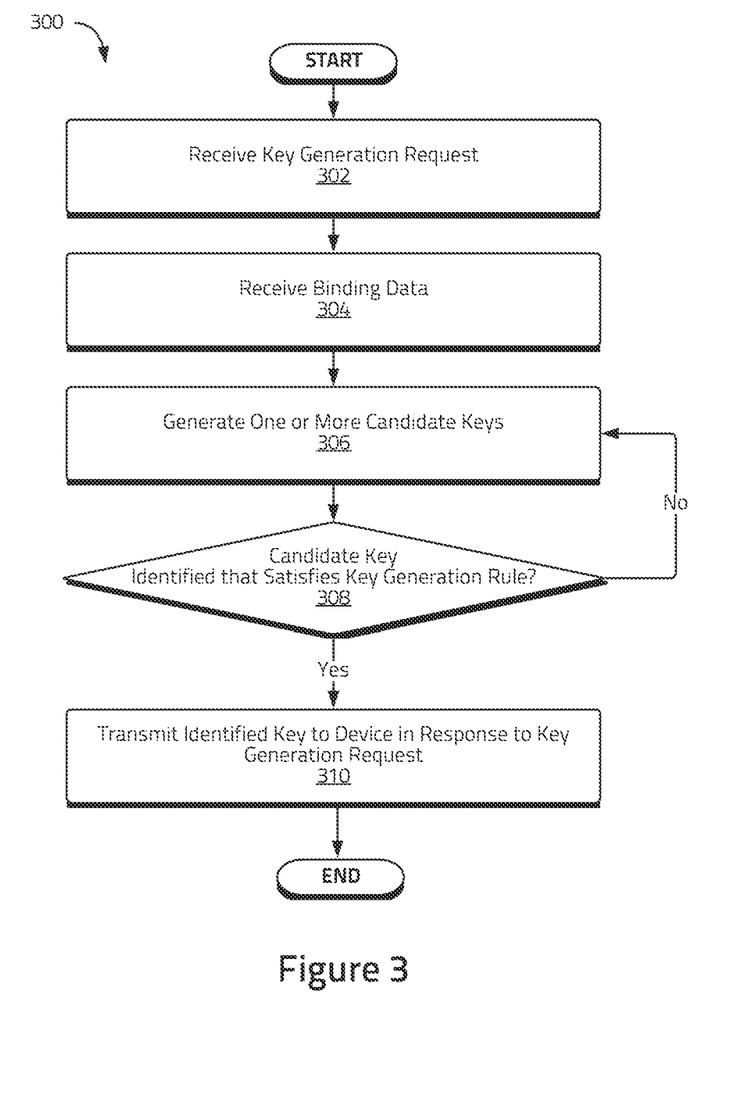
FIG. 3 illustrates a flow chart of an example of a method for generating keys in accordance with one or more rules consistent with embodiments of the present disclosure.

FIG. 3 illustrates a flow chart of an example of a method 300 for generating keys in accordance with one or more rules consistent with embodiments of the present disclosure. The illustrated method 300 and/or aspects thereof may be performed by and/or in conjunction with software, hardware, firmware, and/or any combination thereof. In various embodiments, the method 300 may be performed by a device and/or system implementing a key service consistent with certain aspects of the disclosed systems and methods.

At 302, a key service may receive a key generation request. In some embodiments, the key service may operate on and/or otherwise be associated with a service and/or system, and may receive the key generation request from a service, device, and/or system separate from the service and/or system operating and/or associated with the key service. In further embodiments, the key service may operate as a secure system and/or device-level service of a device and/or system, and the key generation request may be received by the service from an application and/or other service executing on the same device and/or system.

In certain embodiments, the key generation request may specify one or more key generation rules that should be used in connection with generating the requested key. For example and without limitation, the key generation request may comprise identification information specifying a key generation rule, specified key generation rule parameters, an indication and/or level of complexity associated with generating a requested key, and/or associated information. In some embodiments, the key generation request may comprise information (e.g., identification information, rule and/or key complexity information, and/or the like) that may be used by the key service to identify one or more key generation rules to use to generate a key in response to the request. For example, the key generation request may comprise information that may be used by the key service to identify at least one key generation rule from a database of one or more rules maintained by the key generation service for use in generating the requested key.

Binding data may be received by the key service at 304. As discussed above, the binding data may comprise any data that may be associated with the key generated by the key service in response to the request received at 302. The binding data may comprise identification information such as, for example and without limitation, an email address, although other types of binding data and/or associated derivatives (e.g., hashes and/or other transformations) of binding data may also be used. In some embodiments, the binding data may be received as part of the key generation request.

At 306, the key service may generate one or more candidate keys. The one or more candidate keys may be compared with one or more applicable key generation rules at 308. As discussed above, in some embodiments, the one or more key generation rules may be specified in the key generation request. For example, the one or more key generation rules may be specified directly in the key generation request via identification information specifying a key generation rule and/or explicitly specified key generation rule parameters. In another example, the one or more applied key generation rules may be selected by the key service from one or more available key generation rules managed by the key service based on rule complexity and/or other associated information specified in the key request.

If a candidate key does not meet one or more requirements specified in an applied key generation rule, the method may return to 306 and one or more additional candidate keys may be generated until applicable key generation rule requirements are satisfied. If a candidate key meets one or more of the requirements specified in the applied key generation rule, the method 300 may proceed to 310. For example, if a key generation rule specifies that a generated key and/or a derivative of a generated key should include a defined bit and/or byte integer pattern, a candidate key may be examined at 308 to determine whether the candidate key and/or a derivative of the candidate key includes the bit and/or byte integer pattern (potentially in a location specified by the key generation rule). In another non-limiting example, if a key generation rule specifies that generated keys and/or derivatives of generated keys should have a predefined relationship with associated binding data and/or a derivate of the binding data (e.g., sharing specific bit and/or byte patterns with the binding data and/or derivative of the binding data, potentially in one or more specified locations), a candidate key may be examined at 308 to determine whether the candidate key and/or a derivative of the candidate key has the predefined relationship with the associated binding data and/or a derivative of the binding data.

At 310, after identifying a candidate key that meets the one or more requirements of the applied key generation rule, the key service may return the key to the requesting service, system, and/or device. In further embodiments, the key service may store the key and/or a derivative of the key, potentially with associated binding data and/or a derivative of the binding data, in a database maintained by the key service and/or by a key verification service. In certain embodiments, keys and/or binding data included in such a database may be used in connection with various key validation and/or other cryptographic processes.

Figure 4:
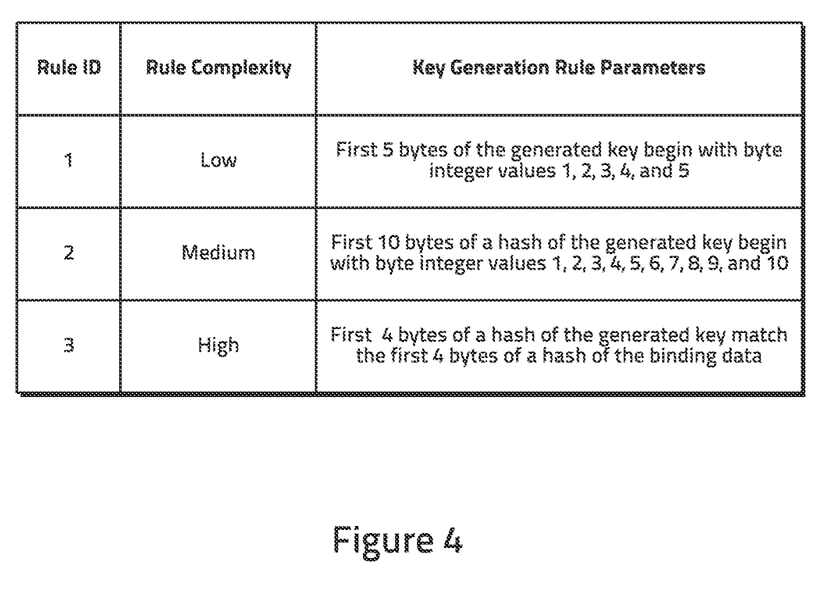
FIG. 4 illustrates an example of key generation rules consistent with certain embodiments of the present disclosure.

FIG. 4 illustrates an example of key generation rules consistent with certain embodiments of the present disclosure. In various embodiments, each key generation rule may be associated with rule identification information (e.g., a "Rule ID"). In certain embodiments, the identification information may uniquely identify the associated key generation rule. Rule identification information may be expressed in a variety of suitable ways and/or formats including, for example and without limitation, as a numeric identifier as shown in the figures.

In further embodiments, the key generation rules may be associated with an indication and/or a level of complexity associated with generating a requested key in accordance with a rule. For example, a relatively simple rule whereby generating a key in accordance with the rule requires relatively low computational complexity and/or involvement may be associated with a "low" level of complexity. A relatively more complex rule whereby generating a key in accordance with the rule requires relatively intensive computational complexity and/or involvement may be associated with a "high" level of complexity. In various embodiments, the relative complexity of a key generation rule may increase as a number of matching bits and/or bytes specified by the rule increase. Although various embodiments herein, including the examples illustrated in the figure, show indications of rule complexity as being "high", "medium", and "low", it will be appreciated that any suitable concentration and/or indication of rule complexity may also be used (e.g., numerical indications and/or the like).

A variety of key generation rules may be used in connection with embodiments of the disclosed key generation systems and methods. In various embodiments, a key generation rule may comprise one or more rule parameters articulating one or more requirements associated with the rule. In certain embodiments, key generation rule parameters rules may specify that generated keys and/or derivatives thereof (e.g., hashes of the keys) should include certain defined bit and/or byte patterns. For example, as illustrated, a key generation rule parameter may specify that the first five bytes of a generated key complying with the rule comprise a 1, 2, 3, 4, 5 byte integer pattern. Similarly, a more complex rule may specify that the first ten bytes of a generated key complying with the rule comprise a 1, 2, 3, 4, 5, 6, 7, 8, 9, 10 byte integer pattern.

In further embodiments, key generation rules may specify that generated keys should have a predefined relationship with associated binding data. For example, a rule may specify that a certain number of bytes of generated key and/or a hash of a generated key should match a certain number of bytes of binding data and/or a hash of the binding data associated with the key. In the illustrated example, a key generation rule may specify that the first four bytes of a hash of a generated key should match the first four bytes of a hash of the associated binding data. In some embodiments, key generation rules specifying that generated keys have a predefined relationship with associated binding data may comprise relatively higher complexity key generation rules than rules that do not require that generated keys have a predefined relationship with binding data.

Figure 5:
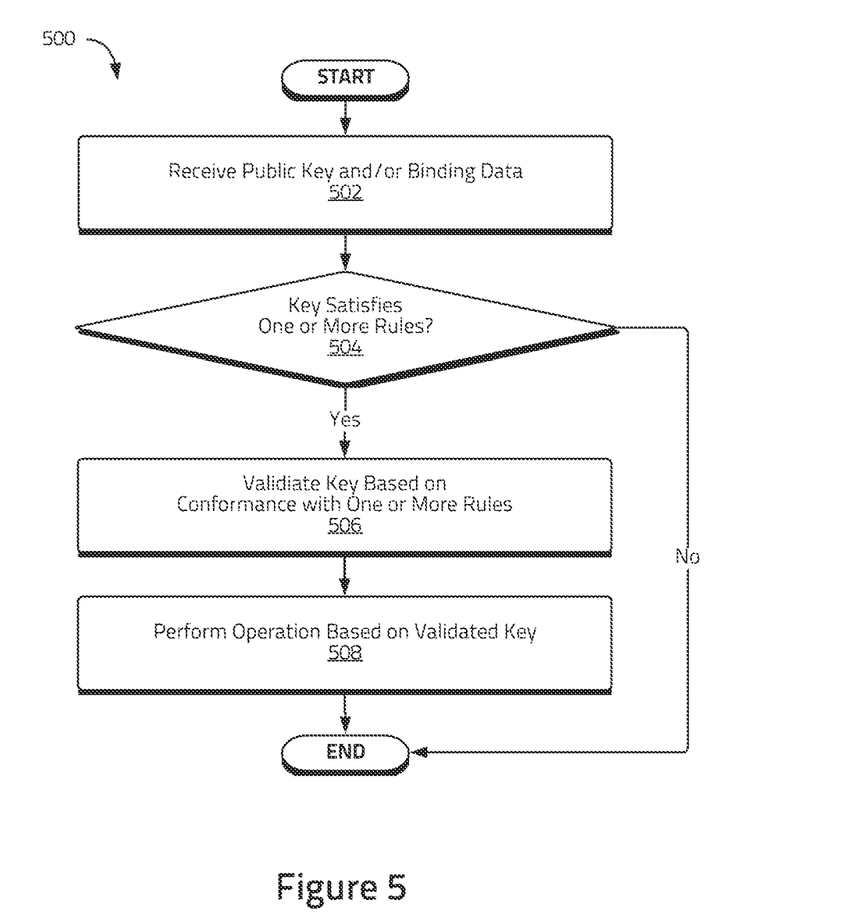
FIG. 5 illustrates a flow chart of an example of a method for validating keys consistent with certain embodiments disclosed herein.

FIG. 5 illustrates a flow chart of an example of a method 500 for validating keys consistent with certain embodiments disclosed herein. The illustrated method 500 and/or aspects thereof may be performed by and/or in conjunction with software, hardware, firmware, and/or any combination thereof. In various embodiments, the method 500 may be performed by a device and/or system validating that a key was generated in accordance with a key generation rule consistent with certain aspects of the disclosed systems and methods.

At 502, a key (e.g., a public key) and/or associated binding data may be received. In certain embodiments, the key and/or associated binding data may be received by a key validation service which may be implemented by, for example, a key generation service as disclosed herein and/or another system and/or service. In further embodiments, the key validation service may be a system and/or device-level service used by a system and/or device to validate keys and/or associated binding data received by the system and/or device.

The key may be analyzed at 504 to determine whether it complies with one or more applicable key generation rules. In certain embodiments, information relating to an applicable key generation rule may be provided with and/or otherwise specified in connection with the key received at 502. In some embodiments, the key generation rule may be specified by key generation rule identification information provided with and/or otherwise associated with the key.

In further embodiments, a service implementing the key validation processes may compare the key with a one or more key generation rules managed by the service to determine whether the key conforms with any of the key generation rules managed by the service. For example, without prior knowledge of a particular key generation rule, the service may compare the key with one or more key generation rules until the service determines that the key complies with at least one (and potentially more) key generation rules and/or that the key does not comply with any of the key generation rules managed by the service.

If the key does not comply with a specified key generation rule and/or a key generation rule managed by the service, the service may end the key validation process and/or return an indication that the key is not valid. If, however, the key complies with a specified key generation rule and/or a key generation rule managed by the service, the method 500 may proceed to 506 where the key may be validated. In some embodiments, validation of a key may depend not only on conformance with an applicable key generation rule, but also conformance with a key generation rule associated with a particular level of complexity. In some embodiments, the level of complexity may be specified by a device, system, and/or service providing the key for validation (e.g., specified as "low", "medium", "high", a numerical indication of complexity, and/or the like). In further embodiments, the level of complexity may depend on an intended operation to be performed using and/or otherwise based on the validated key. For example, in some embodiments, if an operation to be performed using a key undergoing validation is particularly secure, a device, system, and/or service submitting the key for validation may require that the key conform with a key generation rule associated with a relatively high complexity for the key to be successfully validated.

At 508, the validated key may be used to be perform an associated operation. For example, the validated key may be used in connection with a cryptographic operation. In further embodiments, an operation may be performed that does not necessarily use the validated key but may be predicated based on the successful validation of the key.

In some embodiments, the key generation rules and/or associated key validation processes described herein may be used improve the efficiency of extended processes within the system and/or provide improved resistance to various forms of denial-of-service attacks. For example, in many system architectures, cryptographic keys are often used to generate other cryptographically derived objects (e.g., cryptographic signatures, certificates, certificate chains, signed documents, etc.). Use or storage of these cryptographically derived objects may subsequently require the consumption of significant system resources such as memory, network capacity, processing cycles, etc. If one or more of these system resources are constrained at a point within the system, this may present a point of failure for the system and/or a weakness to be exploited for attack purposes. To mitigate such failures or attacks, in some embodiments, systems may filter and/or scan for such derived and/or otherwise cryptographically linked objects and take appropriate corrective and/or preventative actions.

In at least one non-limiting example, a system may scan a database of certificates or certificate chains to identify certificates that were generated with and/or are otherwise cryptographically associated with a key or keys that do not conform with one or more required key generation rules. If such certificates are found, the system may, for example, delete the certificate from memory and/or storage, filter the certificate from data items to be transmitted, and/or skip further processing of the certificate to avoid unnecessary consumption of resources. Although this example relates to the use of cryptographic objects such as certificates, it will be appreciated that this process could also be applied similarly to other types of cryptographically associated objects such as, for example and without limitation, digital signatures and/or other cryptographically bound objects and/or documents.

In further embodiments, systems may be configured to share the key generation rules and/or associated data related to key generation (e.g., pattern information, shared secrets, etc.) with trusted clients, servers, and other components of the system. For example, a key generation and/or key validation rule may specify a pattern of bits in a keyed hash of the key (e.g., a HMAC of the key using a shared secret). If provisioning of the shared secret required to calculate the keyed hash is limited to trusted and/or approved components within the system, these trusted and/or approved components may have increased resistance to attacks such as key flooding attacks relative to other non-trusted or non-approved components, and may be able to function sufficiently despite such attacks. Establishment of such a subset of trusted and/or approved components within the system may still allow participating clients and or users of the system to generate, share, and/or validate keys using various processes described herein. In some embodiments, distributing associated shared secret(s) and/or secret key generation rule(s) may entail using a separate out-of-band process.

Figure 6:
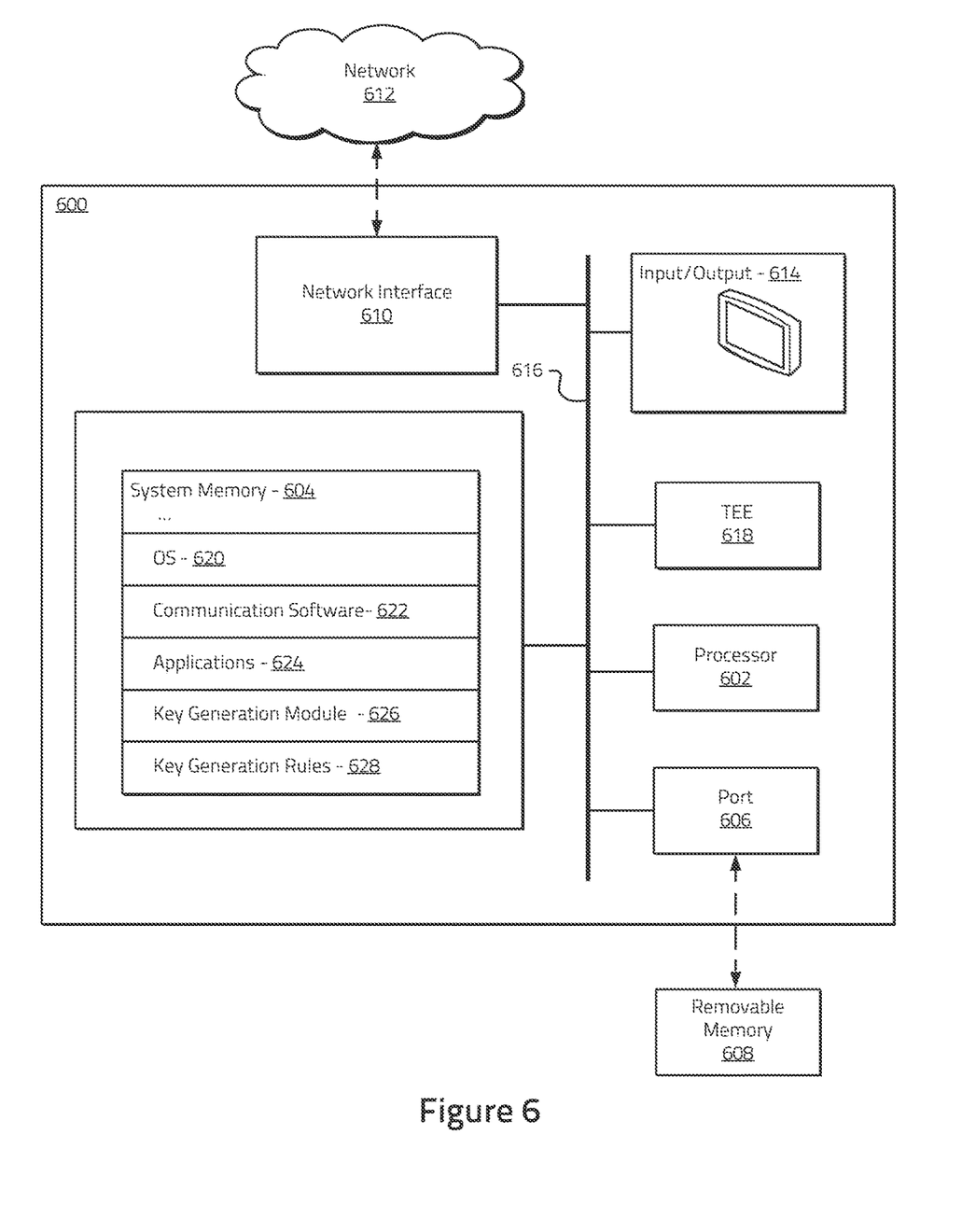
FIG. 6 illustrates an example of a system that may be used to implement certain embodiments of the systems and methods of the present disclosure.

FIG. 6 illustrates a system 600 that may be used to implement certain embodiments of the systems and methods of the present disclosure. For example, in some embodiments, a key service and/or other system generating keys (e.g., public keys) consistent with various aspects of the disclosed embodiments may include certain elements included in the illustrated system. As illustrated in FIG. 6, the system 600 may include: a processing unit 602; system memory 604, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 602; a port 606 for interfacing with removable memory 608 that may include one or more diskettes, optical storage mediums (e.g., flash memory, thumb drives, USB dongles, compact discs, DVDs, etc.) and/or other non-transitory computer-readable storage mediums; a network interface 610 for communicating with other systems via one or more network connections 612 using one or more communication technologies; a user interface 614 that may include a display and/or one or more input/output devices such as, for example, a touchscreen, a keyboard, a mouse, a track pad, and the like; and one or more busses 616 for communicatively coupling the elements of the system 600.

In some embodiments, the system 600 may, alternatively or in addition, include a TEE 618, a SPU, and/or other trusted and/or otherwise secure hardware that is protected from tampering by a user of the system 600 or other entities by utilizing secure physical and/or virtual security techniques. A TEE 618, a SPU, and/or other trusted and/or otherwise secure can help enhance the security of sensitive operations such as personal information management, trusted credential and/or key management, privacy and policy management, and other aspects of the systems and methods disclosed herein. In certain embodiments, the TEE 618, a SPU, and/or other trusted and/or otherwise secure may operate in a logically secure processing domain and be configured to protect and operate on secret information, as described herein. In some embodiments, the TEE 618, a SPU, and/or other trusted and/or otherwise secure may include internal memory storing executable instructions or programs configured to enable the TEE 618, a SPU, and/or other trusted and/or otherwise secure to perform secure operations, as described herein.

The operation of the system may be generally controlled by a processing unit 602 and/or a TEE 618, a SPU, and/or other trusted and/or otherwise secure operating by executing software instructions and programs stored in the system memory 604 (and/or other computer-readable media, such as removable memory 608). The system memory 604 may store a variety of executable programs or modules for controlling the operation of the system. For example, the system memory 604 may include an OS 620 that may manage and coordinate, at least in part, system hardware resources and provide for common services for execution of various applications. The system memory may further include, without limitation, communication software 622 configured to enable in part communication with and by the system, applications 624, one or more key generation modules 626 configured to perform key generation operations consistent with various aspects of the disclosed embodiments, one or more key generation rules 628 and/or associated binding data, and/or any other information, modules, and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, devices, services, and/or components presented in connection with the figures and/or associated description within the scope of the inventive body of work, and that the examples presented in the figures are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for generating at least one cryptographic key performed by a system comprising a processor and non-transitory computer-readable medium storing instructions that, when executed by the processor, cause the system to perform the method, the method comprising:

receiving, by a key service executing on the system, a key generation request, the key generation request comprising a request for the key service to generate at least one cryptographic key;

generating, by the key service based on the key generation request, the at least one requested cryptographic key, wherein generating the at least one cryptographic key comprises:

generating one or more candidate cryptographic keys, the one or more candidate cryptographic keys being, at least in part, randomly generated;

comparing the one or more candidate cryptographic keys with one or more key generation rules to determine whether at least one cryptographic key of the one or more candidate cryptographic keys complies with one or more requirements specified in the one or more key generation rules;

identifying at least one generated cryptographic key of the one or more generated candidate cryptographic keys that complies with the one or more requirements specified in the one or more key generation rules; and sending, by the key service, a key provisioning response to the key generation request, the key provisioning response comprising the identified at least one generated cryptographic key.

2. The method of claim 1, wherein the key generation request is received from a system separate from the system executing the key service.

3. The method of claim 1, wherein the key service comprises a system-level service and the key generation request is received from an application executing on the system.

4. The method of claim 1, wherein the one or more requirements specified in the one or more key generation rules comprise at least one requirement that a cryptographic key satisfying the at least one requirement comprises at least one specified pattern.

5. The method of claim 4, wherein the one or more requirements specified in the one or more key generation rules comprise at least one requirement that the cryptographic key satisfying the at least one requirement comprises the at least one specified pattern in a specified location within the cryptographic key.

6. The method of claim 1, wherein the one or more requirements specified in the one or more key generation rules comprise at least one requirement that a derivative of a cryptographic key satisfying the at least one requirement comprises at least one specified pattern.

7. The method of claim 6, wherein the one or more requirements specified in the one or more key generation rules comprise at least one requirement that the derivative of a cryptographic key satisfying the at least one requirement comprises the at least one specified pattern in a specified location within the derivative of the cryptographic key.

8. The method of claim 6, wherein the derivative of the cryptographic key comprises a hash of the cryptographic key.

9. The method of claim 1, wherein the method further comprises receiving binding data.

10. The method of claim 9, wherein the binding data is included in the key generation request.

11. The method of claim 9, wherein the binding data comprises identification information.

12. The method of claim 11, wherein the identification information comprises an e-mail address.

13. The method of claim 9, wherein the one or more requirements specified in the one or more key generation rules comprise at least one requirement that a cryptographic key satisfying the at least one requirement has a specified relationship with the binding data.

14. The method of claim 13, wherein the specified relationship comprises the cryptographic key and the binding data both comprising at least one specified pattern.

15. The method of claim 14, wherein the specified relationship comprises the cryptographic key and the binding data both comprising the at least one specified pattern in a specified location.

16. The method of claim 9, wherein the one or more requirements specified in the one or more key generation rules comprise at least one requirement that a derivative of a cryptographic key satisfying the at least one requirement has a specified relationship with a derivative of the binding data.

17. The method of claim 16, wherein the derivative of the cryptographic key comprises a hash of the cryptographic key and the derivative of the binding data comprises a hash of the binding data.

18. The method of claim 16 wherein the specified relationship comprises the derivative of the cryptographic key and the derivative of the binding data both comprising at least one specified pattern.

19. The method of claim 18, wherein the specified relationship comprises the derivative of the cryptographic key and the derivative of the binding data both comprising the at least one specified pattern in a specified location.

20. The method of claim 1, wherein the key generation request specifies at least one of the one or more key generation rules.

* * * * *